United States Patent [19]
Keskar et al.

[11] Patent Number: 6,066,307
[45] Date of Patent: May 23, 2000

[54] METHOD OF PRODUCING HYDROGEN USING SOLID ELECTROLYTE MEMBRANE

[76] Inventors: Nitin Ramesh Keskar, 138 Spicer Creek Run, Apt. 11, Grand Island, N.Y. 14072; Ravi Prasad, 12 Yardley La., East Amherst, N.Y. 14051; Christian Friedrich Gottzmann, 5308 Thompson Rd., Clarence, N.Y. 14031

[21] Appl. No.: 09/396,199

[22] Filed: Sep. 15, 1999

Related U.S. Application Data

[63] Continuation of application No. 08/848,200, Apr. 29, 1997, abandoned.

[51] Int. Cl.[7] .............................. C01B 3/02; C01B 3/24; C01B 3/26
[52] U.S. Cl. .................. 423/648.1; 252/373; 423/650; 423/651; 423/652
[58] Field of Search .................. 423/648.1, 650, 423/651, 652; 252/373

[56] References Cited

U.S. PATENT DOCUMENTS

| | | | |
|---|---|---|---|
| 3,901,669 | 8/1975 | Seiter | 55/16 |
| 4,120,663 | 10/1978 | Fally | 422/198 |
| 4,536,196 | 8/1985 | Harris | 423/650 |
| 4,810,485 | 3/1989 | Marianowski et al. | 423/648.1 |
| 5,160,713 | 11/1992 | Mazanec et al. | 204/265 |
| 5,215,729 | 6/1993 | Boxbaum | 423/648.1 |
| 5,276,237 | 1/1994 | Mieville | 423/418.2 |
| 5,306,411 | 4/1994 | Mazanec et al. | 204/265 |
| 5,637,259 | 6/1997 | Galuszka et al. | 423/650 |
| 5,733,435 | 3/1998 | Prasad et al. | 205/765 |

FOREIGN PATENT DOCUMENTS

| | | |
|---|---|---|
| 0748648 | 12/1996 | European Pat. Off. |
| 0778069 | 11/1997 | European Pat. Off. |
| 1242401 | 9/1989 | Japan |

OTHER PUBLICATIONS

Balachandran et al., "Fabrication and Characterization of Dense Ceramic Membranes for Partial Oxidation of Methane", Proc. of Coal Liquefaction and Gas Conversion Contractors 'Review Conference, Pittsburgh, PA (Aug. 29–31, 1995).

Balachandran et al., "Dense Ceramic Membranes for Converting Methane to Syngas", First International Conference on Ceramic Membranes, 188th meeting to the Electrochemical Society, Inc., Chicago, IL (Oct. 8–13, 1995).

T. J. Mazanec, "Electropox: BP'Novel Oxidation Technology", in The Activation of Dioxygen and Homogeneous Catalytic Oxidation (D. Barton et al., eds), pp. 85–96, Plenum Press, NY 1993. (No Month).

Nozaki et al., "Oxide Ion Transport for Selective Oxidation Coupling of Methane with New Membrane Reactor", AIChE J., vol. 40, No. 5, pp. 870–877 (1994). (No Month).

Nagamoto et al., "Methane Oxidation by Oxygen Transported Through Solid Electrolyte" J. Catal., vol. 126 pp. 671–673 (1990). (No Month).

*Primary Examiner*—Wayne Langel
*Attorney, Agent, or Firm*—Bernard Lau

[57] ABSTRACT

A process for producing synthesis gas and hydrogen by passing a compressed and heated oxygen-containing gas mixture into a reactor having at least one solid electrolyte oxygen ion transport membrane to separate transported oxygen Organic fuel reacts with the oxygen to form synthesis gas. The resulting synthesis gas is separated into hydrogen gas through at least one solid electrolyte hydrogen transport membrane to separate the transported hydrogen in the same or different separator.

19 Claims, 2 Drawing Sheets

METHOD OF PRODUCING HYDROGEN USING SOLID ELECTROLYTE MEMBRANE

This application is a continuation of application Ser. No. 08/848,200 filed Apr. 29, 1997, abandoned.

FIELD OF THE INVENTION

This invention relates to the production of hydrogen gas using a solid electrolyte membrane, and more particularly to the production of hydrogen gas by initially producing synthesis gas using a solid electrolyte ion transport membrane and separating hydrogen gas using another solid electrolyte membrane.

CROSS REFERENCE

U.S. patent application Ser. No. 08/848,258 (Attorney Docket No. D-20215) entitled "Method for Producing Oxidized Product and Generating Power Using a Solid Electrolyte Membrane Integrated with a Turbine", filed concurrently herewith, is incorporated herein by reference.

BACKGROUND OF THE INVENTION

Solid electrolyte ionic or mixed conductor ion transport membranes have been employed to extract oxygen from gases at temperatures within the range of about 500° C. to about 1200° C. The optimum operating temperature for gas transport is dependent on the membrane itself, particularly the material from which it is constructed. Ionic conductivity is also a function of operating temperature, and increases as the operating temperature increases. At operating temperatures less than about 500° C., in addition to the lower ionic conductivity of ion transport membranes, surface kinetic limitations on the membrane may also constrain oxygen flux, that is, the quantity of oxygen per unit area per unit time.

Operating temperatures for ion transport membranes greater than about 1200° C. are also undesirable because material and construction limitations (such as sealing, manifolding and thermal stress) are exacerbated at higher temperatures.

One of the most attractive features of the oxygen ion transport membrane system is the membrane's infinite selectivity for oxygen transport and the fact that this oxygen transport is driven by the ratio of oxygen activities on the opposite sides of the membrane. Thus high oxygen fluxes are possible with a reaction occurring on the anode-side. Also, it is possible to transport oxygen from a low pressure oxygen-containing stream to a high pressure reacting environment.

At elevated temperatures, oxygen-ion transport materials contain mobile oxygen-ion vacancies that provide conduction sites for selective transport of oxygen ions through the material. The transport is driven by the difference in partial pressure across the membrane, as oxygen ions flow from the side with higher partial pressure of oxygen to that with lower partial pressure of oxygen. Ionization of oxygen molecules to oxygen ions takes place on the "cathode-side" of the membrane, and the oxygen ions are then transported across the ion transport membrane. The oxygen ions deionize on the "anode-side" across the membrane to re-form oxygen molecules. For materials that exhibit only ionic conductivity, external electrodes may be placed on the surfaces of the electrolyte and the electronic current is carried in an external circuit. In "mixed conducting" materials, electrons are transported to the cathode internally, thus completing the circuit and obviating the need for external electrodes. Dual phase conductors, in which an oxygen ion conductor is mixed with an electronic conductor, are one type of mixed conductor.

Partial oxidation reactions ("POx") and/or steam reforming reactions involving carbonaceous feedstocks are common methods for producing synthesis gas. Synthesis gas and its major components, carbon monoxide and hydrogen, are valuable industrial gases and important precursors for production of chemicals including ammonia, alcohols (including methanol and higher carbon alcohols), synthesis fuels, acetic acid, aldehydes, ethers, and others Feedstocks including natural gas, coal, naphtha, and fuel oils are commonly used to produce synthesis gas by partial oxidation or steam reforming reactions These reactions may be represented as follows:

$C_mH_n + m/2\ O_2 = m\ CO + n/2\ H_2$ POx, exothermic $C_mH_n + m\ H_2O = CO + (m+n/2)\ H_2$ SR, endothermic, where $C_mH_n$ is a hydrocarbon feedstock.

To improve the rates of reactions and selectivity of certain products, an external catalyst in the form of a fixed or fluidized bed, or a plurality of catalyst tubes, may be used. Individual synthesis gas components, notably hydrogen and carbon monoxide, can be obtained using a number of conventional gas separation methods known in the art such as those based on pressure swing adsorption, temperature swing adsorption, polymeric membranes, and cryogenic distillation Water-gas shift reaction may be carried out to increase the yield of hydrogen by converting the CO in the synthesis gas to $H_2$ and $CO_2$ by reaction with steam ($CO + H_2O = CO_2 + H_2$).

Conventional partial oxidation processes frequently use oxygen molecules produced by traditional gas separation processes that typically operate at temperatures below 100° C. Since the partial oxidation reaction itself typically requires a high temperature of operation at over 800° C., integration between partial oxidation reaction and traditional oxygen separation has not been realized previously. As a result, conventional partial oxidation reaction has often been characterized by low feedstock conversion, low hydrogen to carbon monoxide ratio, and low hydrogen and carbon monoxide selectivity. Additionally, the external oxygen supply typically required in a partial oxidation reaction adds significantly to capital and operating costs, which may amount to as much as 40% of the total synthesis gas production cost. Moreover, inefficiencies are introduced as the high amount of carbon monoxide gas produced in the partial oxidation reaction product requires a two stage shift conversion when only hydrogen is required as the final product. Shift conversion also adds to the process cost.

The steam reforming reactions are also used for synthesis gas production. Since the steam reforming process produces more hydrogen per mole of organic fuel than the partial oxidation reaction, this process is more advantageous for the production of hydrogen and mixtures with a high $H_2/CO$ ratio (i.e., a ratio of greater than 2). However, steam reforming is an endothermic reaction requiring a significant amount of thermal energy, and accordingly, is a less attractive method for synthesis gas production when the $H_2/CO$ ratios are below 2.

In the past, development in the oxygen ion transport membrane system area have included the combination of the membrane system in conjunction with gas turbines. U.S. Pat. Nos. 5,516,359, 5,562,754, 5,565,017 and EPO Patent No. 0,658,366 disclose the production of oxygen in a process that is integrated with a gas turbine system. Commonly assigned U.S. patent application Ser. No. 08/490,362, pending entitled "Method for Producing Oxygen and Generating Power Using a Solid Electrolyte Membrane Integrated with a Gas Turbine" is also directed to oxygen production using ion transport membrane system integrated with gas turbine, and is incorporated herein by reference.

Oxygen-ion transport membrane materials useful for synthesis gas production have been disclosed by U. Balachandran et al., in "Fabrication and Characterization of Dense Ceramic Membranes for Partial Oxidation of Methane", Proc. of Coal Liquefaction and Gas Conversion Contractors' Review Conference, Pittsburgh, Pa. (Aug. 29–31, 1995) and "Dense Ceramic Membranes for Converting Methane to Syngas", submitted to the First International Conference on Ceramic Membranes, 188th meeting to the Electrochemical Society, Inc., Chicago, Ill. (Oct. 8–13, 1995). U.S. Pat. No. 5,306,411 (Mazanec et al.) discloses a process that integrates oxygen separation with partial oxidation (for synthesis gas production) or oxidative coupling of methane.

Despite the emerging technological advances involving ion transport membrane systems, the present inventors are not aware of any disclosure of the practical integration of ion transport membrane systems based on the production of synthesis gas and a hydrogen separation system using solid electrolyte ion transport membrane, and further the separation thereof in a single unit.

OBJECTS OF THE INVENTION

It is therefore an object of the invention to provide a process for the integration of oxygen ion transport based synthesis gas production and hydrogen separation using hydrogen transport membranes, such as that based on palladium or palladium-alloys or proton transport membranes.

It is a further object of this invention to provide such a process wherein partial oxidation and steam reforming reactions can occur together to achieve close to an energy neutral configuration.

A still further object is to provide an improved process for producing synthesis gas that is economically attractive, flexible and thermodynamically efficient.

A still further object of the invention is to balance the heats of reaction by using a relatively large mass of the oxygen-containing gas (generally air) on the cathode-side of the oxygen ion transport membrane as a "heat sink".

It is a further object of the invention to achieve gas inlet and outlet temperatures lower than the reaction temperatures by having reactant gases on the anode-side flow countercurrently to the oxygen-containing stream (generally air) on the cathode-side.

It is still a further object of the invention to increase the conversion of the organic fuel to synthetic gas on the anode-side by removing hydrogen from the synthesis gas conversion zone using ion transport membranes.

SUMMARY OF THE INVENTION

This invention is directed to a process for producing hydrogen gas and synthesis gas. The process comprises passing a compressed and heated oxygen-containing gas mixture into an oxygen reactor which has at least one solid electrolyte oxygen ion transport membrane. The reactor has a first zone and a second zone separated by the oxygen ion transport membrane. At least a portion of oxygen from the mixture is transported across the oxygen ion transport membrane from the first zone to the second zone to react with a purge stream containing a gas phase organic fuel while producing an oxygen-depleted retentate stream from the first zone. The purge stream is passed into the second zone to react with the transported oxygen to produce synthesis gas. The synthesis gas is directed to contact at least one hydrogen transport membrane to generate a high purity hydrogen permeate and a hydrogen-depleted synthesis gas retentate. Subsequently, the high purity hydrogen permeate is withdrawn as a hydrogen gas product.

Another embodiment comprises the steps of passing a compressed and heated oxygen-containing gas mixture into an oxygen reactor having at least one solid electrolyte oxygen ion transport membrane. The reactor has a first zone and a second zone separated by the first oxygen ion transport membrane. At least a portion of oxygen from the mixture is transported across the oxygen ion transport membrane from the first zone to the second zone to generate an oxygen-depleted retentate stream from the first zone. A gas phase organic fuel, and steam, and optionally $CO_2$, are passed into the second zone to react with the transported oxygen to produce synthesis gas. The amount of steam and $CO_2$ injected into the second zone may be controlled to change the $H_2$/CO ratios of the synthesis gas stream produced. A stream of the synthesis gas from the second zone is withdrawn and passed into a third zone in a hydrogen separator having at least one solid electrolyte hydrogen transport membrane. The hydrogen separator has a third and a fourth zone separated by the hydrogen transport membrane. At least a portion of the hydrogen gas is transported across the hydrogen transport membrane from the third zone to the fourth zone to generate a hydrogen permeate in the fourth zone and a hydrogen-depleted synthesis gas in the third zone. The hydrogen permeate is withdrawn from the fourth zone as a hydrogen product. The hydrogen separation is chosen so as to operate at the same or moderately lower temperature than the oxygen ion transport membrane.

In yet another embodiment, a compressed and heated oxygen-containing gas mixture is passed into an oxygen reactor having at least one solid electrolyte oxygen ion transport selective membrane and at least one solid electrolyte hydrogen transport membrane. The reactor has a first zone, second zone and a third zone. At least a portion of oxygen from the mixture is transported across the oxygen ion transport membrane from the first zone to the second zone to supply a first oxygen permeate stream to react with a purge stream containing a gas phase organic fuel while producing an oxygen-depleted retentate stream The purge stream is passed into the second zone to react with the transported oxygen to produce synthesis gas. Synthesis gas is directed to contact at least one hydrogen transport membrane to generate a high purity hydrogen permeate in a third zone, and a hydrogen-depleted synthesis gas retentate remains in the second zone. The hydrogen permeate is then withdrawn from the third zone as a hydrogen product. One of the advantages of withdrawing hydrogen from the synthesis gas conversion zone is that it maintains a favorable equilibrium to drive the reaction to completion.

In some of the embodiments, the oxygen-containing gas mixture is heated at least in part by indirect heat exchange with at least one stream comprising the oxygen-depleted retentate gas from the first zone, the hydrogen-depleted retentate synthesis gas and the hydrogen permeate gas from the hydrogen separator.

As used herein, the term "reactor" means a separator in which the transported oxygen undergoes a chemical reaction and the oxygen is consumed thereby.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

Figure 1:
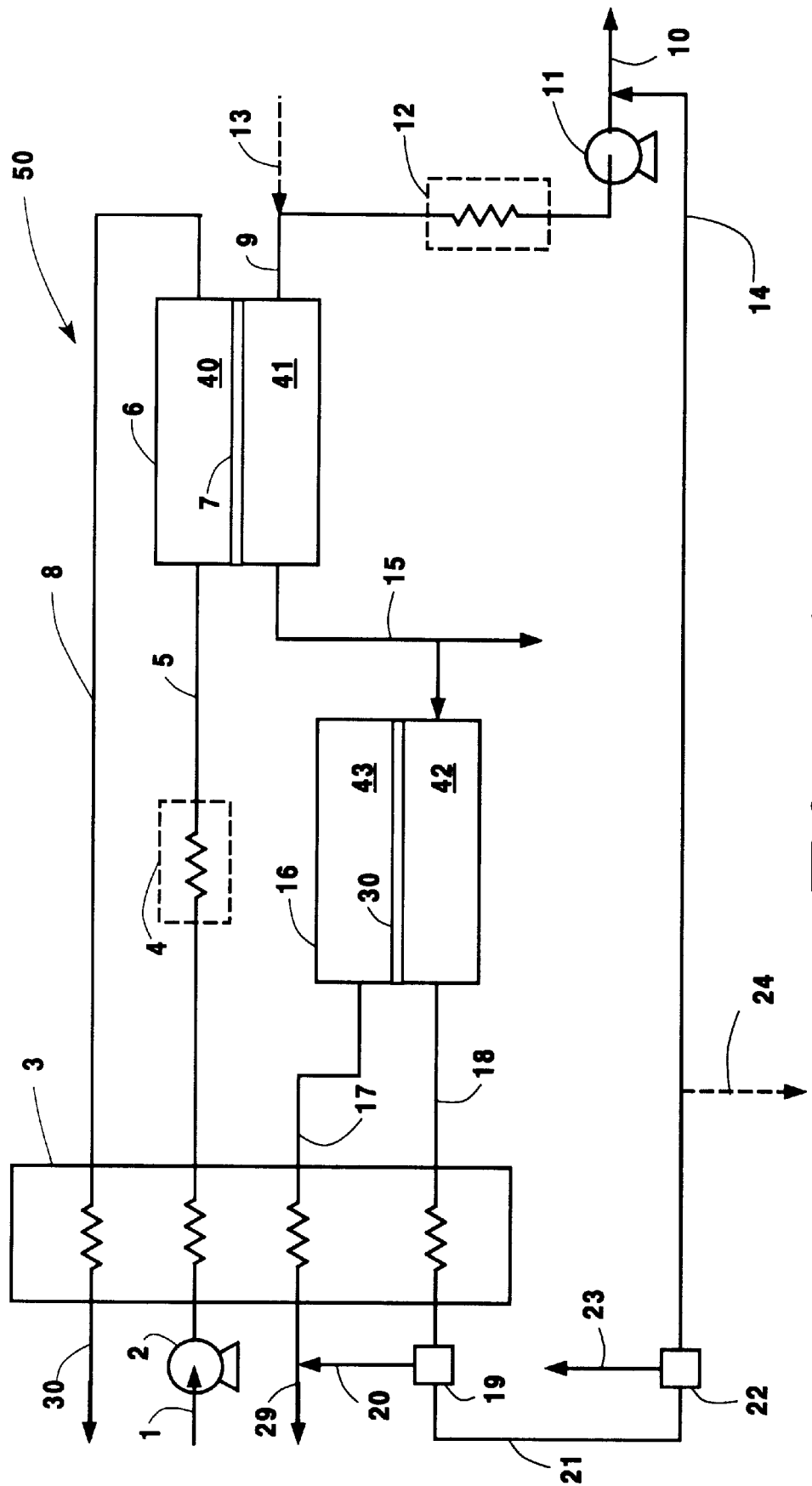
FIG. 1 is a schematic representation of a system for producing hydrogen gas and synthesis gas according to this invention in which synthesis gas emerges from oxygen ion transport in the oxygen reactor, and hydrogen gas emerges from a hydrogen transport membrane in the hydrogen separator.

This invention may be accomplished by processes for hydrogen production using a solid oxygen ion transport membrane to separate oxygen from oxygen-containing gas, i.e., air, and to utilize the separated oxygen in partial oxidation reactions and optionally steam reforming reactions of carbonaceous feedstock. The partial oxidation and/or steam reforming reactions produce synthesis gas which is utilized to produce hydrogen via a hydrogen transport membrane.

Oxidation of fuel on the anode side of the oxygen ion membrane reactor reduces the partial pressure of the oxygen on that side of the membrane. This enhances the driving force in the oxygen reactor, effecting a high oxygen flux and a lower membrane area requirement. These benefits are accrued even when the oxygen-containing feed gas is at a relatively low pressure, and the fuel-side at a high pressure, thus requiring lower power requirements of the system. The partial oxidation reaction, an exothermic reaction, and steam reforming reaction, an endothermic reaction, may be carried out in the same reactor to obtain a nearly energy neutral system. In addition, the heat sink in the form of a relatively large mass of the oxygen-containing gas (generally air) permits it to further balance the heats of reaction and control the temperature of the reaction zone. In another embodiment, the partial oxidation and steam reforming reactions take place in separate ion transport separators. The resulting synthesis gas produced by the oxygen ion transport reactor by partial oxidation and/or a steam reforming reaction is then fed into a hydrogen membrane transport separator. Preferably the oxygen-containing gas and the reacting fuel flow countercurrently. By introducing the fuel and the oxygen-containing gas stream at lower temperatures and relying on the heat transfer internal to the reactor, it is possible to maintain critical reactor parts such as the seals and the structural components at the gas inlet and exit ports of the reactor at intermediate temperatures for ease of mechanical design and lowering the fabrication cost.

Oxygen ion transport membranes are used to separate oxygen from oxygen-containing gas streams. Materials that can conduct oxygen ions as well as electrons are described herein as "mixed conducting oxides" or "mixed conductors". At present, a number of potential mixed conductors have been identified in both the fluorite and perovskite crystal structures. Table I is a partial list of mixed conductors of interest for oxygen production.

TABLE I

Mixed Conductors

Material composition

1. $(La_{1-x}Sr_x)(Co_{1-y}Fe_y)O_{3-\delta}$ ($0 \leq x \leq 1$, $0 \leq y \leq 1$, $\delta$ from stoichiometry)
2. $SrMnO_{3-\delta}$
   $SrMn_{1-x}CO_xO_{3-\delta}$ ($0 \leq x \leq 1$, $0 \leq y \leq 1$, $\delta$ from stoichiometry)
   $Sr_{1-x}Na_xMnO_{3-\delta}$
3. $BaFe_{0.5}Co_{0.5}YO_3$
   $SrCeO_3$
   $YBa_2Cu_3O_{7-\beta}$ ($0 \leq \beta \leq 1$, $\beta$ from stoichiometry)
4. $La_{0.2}Ba_{0.8}Co_{0.8}Fe_{0.2}O_{2.6}$; $Pr_{0.2}Ba_{0.8}Co_{0.8}Fe_{0.2}O_{2.6}$
5. $A_xA'_{x'}A''_{x''}B_yB'_{y'}B''_{y''}O_{3-z}$ (x, x', x'', y, y', y'' all in 0–1 range)
   where: A, A', A'' = from groups 1, 2, 3 and f-block lanthanides
   B, B', B'' = from d-block transition metals
6. (a) Co—La—Bi type:   Cobalt oxide         15–75 mole %
                         Lanthanum oxide      13–45 mole %
                         Bismuth oxide        17–50 mole %
   (b) Co—Sr—Ce type:   Cobalt oxide         15–40 mole %
                         Strontium oxide      40–55 mole %
                         Cerium oxide         15–40 mole %
   (c) Co—Sr—Bi type:   Cobalt oxide         10–40 mole %
                         Strontium oxide       5–50 mole %
                         Bismuth oxide        35–70 mole %
   (d) Co—La—Ce type:   Cobalt oxide         10–40 mole %
                         Lanthanum oxide      10–40 mole %
                         Cerium oxide         30–70 mole %
   (e) Co—La—Sr—Bi type: Cobalt oxide        15–70 mole %
                         Lanthanum oxide       1–40 mole %
                         Strontium oxide       1–40 mole %
                         Bismuth oxide        25–50 mole %
   (f) Co—La—Sr—Ce type: Cobalt oxide        10–40 mole %
                         Lanthanum oxide       1–35 mole %
                         Strontium oxide       1–35 mole %
                         Cerium oxide          0–70 mole %
7. $Bi_{2-x-y}M'_xM_yO_{3-\delta}$ ($0 \leq x \leq 1$, $0 \leq y \leq 1$, $\delta$ from stoichiometry)
   where: M' = Er, Y, Tm, Yb, Tb, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. $BaCe_{1-x}Gd_xO_{3-x/2}$ where, x equals from zero to about 1.
9. One of the materials of $A_sA'_tB_uB'_vB''_wO_x$ family whose composition is disclosed in U.S. Pat. No. 5,306,411 (Mazanec et al.) as follows:

A represents a lanthanide or Y, or a mixture thereof;
   A' represents an alkaline earth metal or a mixture thereof;
   B represents Fe;
   B' represents Cr or Ti, or a mixture thereof;
   B'' represents Mn, Co, V, Ni or Cu, or a mixture thereof;
   and s, t, u, v, w, and x are numbers such that:

s/t equals from about 0.01 to about 100;
   u equals from about 0.01 to about 1;
   v equals from zero to about 1;
   w equals from zero to about 1;
   x equals a number that satisfies the valences of the A, A', B, B', B'' in the formula; and $0.9 < (s + t)/(u + v + w) < 1.1$
10. One of the materials of $La_{1-x}Sr_xCu_{1-y}M_yO_{3-\delta}$ family, where:

M represents Fe or Co;
    x equals from zero to about 1;
    y equals from zero to about 1;
    $\delta$ equals a number that satisfies the valences of La, Sr, Cu, and M in the formula.
11. One of the materials of $Ce_{1-x}A_xO_{2-\delta}$ family, where:

A represents a lanthanide, Ru, or Y; or a mixture thereof;
    x equals from zero to about 1;
    y equals from zero to about 1;
    $\delta$ equals a number that satisfies the valences of Ce and A in the formula.
12. One of the materials of $Sr_{1-x}Bi_xFeO_{3-\delta}$ family, where:

A represents a lanthanide or Y, or a mixture thereof;
    x equals from zero to about 1;
    y equals from zero to about 1;
    $\delta$ equals a number that satisfies the valences of Ce and A in the formula.

TABLE I-continued

Mixed Conductors

Material composition

13. One of the materials of $Sr_xFe_yCo_zO_w$ family, where:

x equals from zero to about 1;
    y equals from zero to about 1;
    z equals from zero to about 1;
    w equals a number that satisfies the valences of Sr, Fe and Co in the formula.

14. Dual phase mixed conductors (electronic/ionic):

$(Pd)_{0.5}/(YSZ)_{0.5}$
    $(Pt)_{0.5}/(YSZ)_{0.5}$
    $(B\text{---}MgLaCrO_x)_{0.5}(YSZ)_{0.5}$
    $(In_{90\%}Pt_{10\%})_{0.6}/(YSZ)_{0.5}$
    $(In_{90\%}Pt_{10\%})_{0.5}/(YSZ)_{0.5}$
    $(In_{95\%}Pr_{2.5\%}Zr_{2.5\%})_{0.5}/(YSZ)_{0.5}$
    Any of the materials described in 1–13, to which a high temperature metallic phase (e.g., Pd, Pt, Ag, Au, Ti, Ta, W) is added.

Although mixed conductors or dual phase conductors are preferred for the pressure driven ion transport separator, this invention also contemplates the use of electrically driven ion transport membranes Typically, the ion transport membrane may be in the form of a dense film, or a thin film supported on a porous substrate. The thickness of the membrane layer is typically less than about 5000 microns, preferably less than 1000 microns, and most preferably less than 100 microns. The ion transport membranes may be in tubular form or planar form.

Analogously, hydrogen transport membranes are used to separate hydrogen from the synthesis gas stream. A number of hydrogen separation units using any of the several high temperature hydrogen technologies, e.g. hydrogen permeable solid membranes, such as that based on palladium or palladium-alloy or proton conductors, are possible. Preferably, proton conductors are used. Table II is a partial list of hydrogen conductors of interest for hydrogen separation.

TABLE II

High temperature proton conductors.

Material composition

1. Doped cerates based on:

(a) $SrCe_{1-x}M_xO_{3-\delta}$ (e.g. $SrCe_{0.95}Yb_{0.05}O_{3-\delta}$) and
    (b) $BaCe_{1-x}M_xO_{3-\delta}$ (e.g. $BaCe_{0.8}Y_{0.2}O_{3-\delta}$ and $BaCe_{0.9}Nd_{0.1}O_{3-\delta}$)
    where, x < than the upper limit of solid solution formation range, generally about 0.2.
    (Generally the doped barium cerates show the highest conductivity.)

2. Substituted solid solution series such as:

(a) $SrCe_{0.9}Y_xNb_yO_{3-\delta}$ [$\delta = (x - y)/2$, and $x + y = 0.1$] and
    (b) $SrCr_{1-z}Zr_zY_{0.05}O_{3-\delta}$ [$\delta = 0.025$]

3. Acceptor(Sc, Y, Yb)-doped $SrZrO_3$ and $SrTiO_3$, perovskite-type

4. Doped zirconates based on $CaZrO_3$ (e.g. $CaZr_{0.9}In_{0.1}O_{3-\delta}$) $SrZrO_3$ (e.g., $SrZr_{0.95}Y_{0.05}O_{3-\delta}$ and $SrZr_{0.9}Y_{0.1}O_{3-\delta}$) and $BaZrO_3$ 5. $SrYb_{0.05}(Cr_{1-x}Zr_x)_{0.95}O_{3-\delta}$ [e.g., x = 0, 0.25, 0,5, 0.75, 1.0, and $\delta$ from stoichiometry]

6. Complex perovskites of the types $A_2$ (B'B")$O_6$ [B' and B" ions have charges 3+ and 5+], and $A_3$ (B'B"$_2$)$O_9$ [B' and B" ions have charges 2+ and 5+], whereas A ions are always charge 2+. E.g., $Ba_3(CaNB_2)O_9$ 7. Acceptor(M = Gd, Y)-doped $BaCeO_3$, i.e. $(Ba_{1-x}M_x)(Ce_{1-y}M_y)O_{3-\delta}$ 8. $BaCe_{1-x}Ca_xO_{3-\delta}$ TABLE II-continued High temperature proton conductors.

Material composition

9. Pyrochlore-type structure oxide ceramics:

$A_2Zr_{2-x}Y_xO_{7-\delta}$ (A = La, Nd, Gd, Sm)
    $Y_2Ti_{2-x}M_xO_{7-\delta}$ (M = In, Mg)

10. Hydrogenated yttrium-barium cuprate:

$H_xBa_2YCu_3O_y$, where x = 2m + h, y = 6.5 + m + d; m = 0, 1, 2; h > 0; d < 1

11. $KTaO_3$-based oxides and $Y_2O_3$ ceramic (Note: Here 'd' is the oxygen deficiency per unit formula.)

The process of this invention may be described by the schematic representation of system 50, FIG. 1, in which a process configuration for employing ion transport technology for synthesis gas and hydrogen gas production is provided. Oxygen-containing gas stream 1 (preferably air) is compressed to a low pressure using blower 2, and then heated against oxygen-depleted retentate stream 8 in heat exchanger 3, and then is directed to oxygen reactor 6, via an optional heater 4 to emerge as heated compressed oxygen-containing gas stream 5. Stream 8 in one embodiment is discarded as waste and in another embodiment is utilized as a nitrogen product stream. Gas stream 5 is fed into first zone 40 of oxygen-ion transport membrane reactor the reactor having been divided into first zone 40 and second zone 41 by oxygen ion transport membrane 7. As used herein, first zone 40 is where oxygen-containing gas 5 is fed, and is referred to as the cathode or retentate side. Typically, the pressure in first zone 40 is 1 to 40 atm, preferably 1 to 10 atm. In reactor 6, a portion of the oxygen of oxygen-containing gas stream 5 in first zone 40 is removed and the exiting stream 8 is an oxygen-depleted stream. The oxygen ion conductivity of the membrane is typically in the range of 0.01 to 100 S/cm, wherein "S" is 1/ohm. Oxygen is transported across the membrane 7 into second zone 41, referred to as the permeate or anode side, where it is reactively purged using gas mixture 9 containing organic fuel 10. If a liquid carbonaceous fuel is used for hydrogen production, it must be vaporized before entering or vaporized within the reactor The pressure of second zone 41 is typically 1 to 100 atm, preferably 1 to 40 atm. The organic fuel in one embodiment is a carbonaceous fuel, preferably methane or a clean burning natural gas, that has been optionally pressurized in compressor 11, and preferably further heated in heater 12, mixed with steam or atomized water 13, and a recycle permeate stream 14 from hydrogen transport membrane separator 16.

Although hydrogen permeable membranes are used here to effect the hydrogen separation, other separation schemes known to those skilled in the art would also be applicable, e.g., pressure swing adsorption, temperature swing adsorption, cryogenic gas separation, polymeric membranes for gas separation.

The steam or atomized water added to the fuel stream encourages the steam reforming process and increases the hydrogen concentration in synthesis gas 15. This is because steam reforming generally produces a vastly higher amount of hydrogen than the partial oxidation process. For example, if methane is used as a fuel, steam reforming provides 50% more hydrogen than the partial oxidation process.

The steam reforming process is generally endothermic while the partial oxidation process of a hydrogen fuel is exothermic. Depending on the heat requirement and heat transfer characteristic of the system, either or both of the partial oxidation and steam reforming reactions may be carried out using a suitable catalyst. And as a result, the use of both the partial oxidation and steam reforming process encourages attaining an "energy-neutral" ion transport system, wherein the exothermic nature of the partial oxidation process provides efficient energy for the steam reforming process. This also encourages achieving a thermally self sustaining process. As discussed earlier, the reaction temperatures can be further suppressed by the heat sink in the form of a relatively large mass of the oxygen-containing gas (generally air).

At the temperatures typical of ion transport membrane operation, the oxygen partial pressure in the oxygen consuming gas stream is low. The low partial pressure facilitates rapid oxygen transport across the oxygen ion transport membrane, even when the pressure of the oxygen-containing gas is relatively low since the oxygen transport is driven by the difference in oxygen activities on the opposite sides of the membrane. This aspect of the reactor enables oxygen to be transported with a low power requirement.

The partial pressure of the oxygen may be increased to enhance the oxygen flux across the oxygen transport membrane. For example, if air is used as the oxygen-containing feed gas, and nitrogen is needed at high pressure, then pressurizing the air could be beneficial. Analogously, compressing the air may not be desirable if nitrogen is not needed as a product at an elevated pressure. The retentate stream may be expanded to recover some work of compression, or combusted in a gas turbine to generate power. If power production is desirable, then the oxygen-containing gas (generally air) should be pressurized to typical gas turbine inlet pressures (100–250 psi). Also, if nitrogen is not needed as a product, it may be beneficial to compress the oxygen-containing gas (generally air) only to a pressure required to offset the change in pressure loss in the reactor.

Under typical operating conditions in the oxygen ion transport membrane reactor, the fuel gas undergoes partial oxidation reaction to produce synthesis gas (hydrogen and carbon monoxide) and a variety of other components including carbon dioxide, water, and other minor components such as higher hydrocarbons. A catalyst may be used in the second zone of the reactor to enhance the desired partial oxidation and steam reforming reactions.

The external catalyst employed for promoting the partial oxidation/steam reforming reactions may be deployed in a number of ways including depositing it on the transport membrane, a fixed bed, a fluidized bed, a catalyst rods or tubes. For example, it is likely that the partial oxidation catalyst is employed on the surface of the oxygen-ion transport membrane and the steam reforming catalyst in the form of a fixed bed. Different catalysts may be needed for partial oxidation and steam reforming reactions, the extent of which may be controlled by mixing the respective catalysts in an appropriate proportions appreciated by the skilled artisan For example, a layered bed of partial oxidation and steam reforming catalyst (e.g., Nio-based catalysts) may be used to control the carbon monoxide/hydrogen ratio in the synthesis gas. The concentrations of steam and $CO_2$ in the purge gas phase may also be used to control the carbon monoxide/hydrogen ratio in the synthesis gas.

As further shown in FIG. 1, synthesis gas 15 emerges from oxygen reactor 6 through partial oxidation reaction of fuel 10 in second zone 41 of reactor 6. Optionally, synthesis gas 15 may be removed and recovered. The stream of synthesis gas 15 may then be fed into second downstream hydrogen membrane separator 16. It may be necessary to moderate the temperature of the synthesis gas stream if the operating temperature of hydrogen transport membrane is lower than the operating temperature of the oxygen ion conducting membrane.

As in the oxygen ion membrane reactor 6, hydrogen separator 16 is also separated into third zone 42, referred to as the hydrogen retentate side or cathode side, and fourth zone 43, referred to as the hydrogen permeate side or the anode side. Third zone 42 and fourth zone 43 are separated by at least one hydrogen transport membrane 30.

Hydrogen gas is permeated through at least one hydrogen transport membrane 30 of hydrogen separator 16. The resulting hydrogen gas stream 17 emerging from fourth zone 43 in separator 16 may enter heat exchanger 3 to transfer heat to upstream oxygen-containing gas stream 1.

It is important that the high pressure of the synthesis gas be maintained in order to sustain the necessary hydrogen partial pressure differential across the hydrogen transport membrane. In this embodiment, compressor 11 may compress the fuel gas to provide the desired conditions for the reaction in second zone 41 and the necessary hydrogen partial pressure in second zone 41 for effective hydrogen transport downstream Preferably, a pressure of about 10 to 50 atm is provided.

Carbon monoxide rich stream 18 emerging from third zone 42 preferably is used to heat oxygen-containing gas stream 1 in heat exchanger 3. Further recovery of hydrogen from retentate stream 18 may be achieved in another separator 19, leaving behind a carbon monoxide rich stream 21. The separation thereby provides hydrogen stream 20 for addition to hydrogen gas stream 17.

This downstream hydrogen recovery process in separator 19 can be carried out either at low temperature under conventional methods known in the art, for example, as in pressure swing adsorption, thermal swing adsorption, polymeric membranes, and cryogenic distillation; or at elevated temperatures, for example, using hydrogen transport solid membranes such as that based on palladium or palladium-alloy or electrically or pressure driven proton conductor membranes. It should be noted that if a proton conducting membrane is used for hydrogen separation, electrodes and external circuits are necessary for the electrically driven process. If the hydrogen transport membrane has sufficient electronic conductivity, a pressure-driven hydrogen separation may be carried out in situ. The choice of downstream hydrogen separation process depends on the pressure and purity at which the hydrogen and carbon dioxide gas are needed. For example, a polymeric membrane process will give a slightly impure hydrogen stream (90–96%) at a low pressure and a relatively pure carbon dioxide at a high pressure, whereas a pressure swing adsorption separation of a high temperature synthesis gas mixture will give a more pure hydrogen stream (96–99.9%) at a high pressure and an impure carbon dioxide at a low pressure. Palladium-based or proton conducting membranes permit production of a very high quality $H_2$ stream by virtue of their infinite selectivity for hydrogen transport.

The hydrogen concentration in the carbon monoxide rich stream may be adjusted using a number of operation parameters by, for example, varying the hydrogen partial pressure differential across the hydrogen transport membrane. Similarly, various parameters associated with the hydrogen transport membrane may be adjusted, such as varying membrane thickness and area.

Carbon monoxide from carbon monoxide rich stream 21 may be recovered by a separator 22, producing an enriched carbon monoxide stream 23. The remaining waste carbon monoxide stream 14 may optionally be discarded as waste stream 24 or recycled to combine with stream organic fuel stream 10 to the oxygen ion transport reactor 6.

If carbon monoxide is not desired as a product, it may be used as a fuel to provide heat input at various stages of this process. For example, it may be used in the waste heat boiler to generate steam needed for this process.

Further, if carbon monoxide is not desired as a product, it can be converted to carbon dioxide as well as to increase hydrogen yield by carrying out water-gas shift reaction. Optionally, carbon monoxide may also be combusted to provide heat needed at various points in the system. Carbon monoxide may also be combusted in a gas turbine integrated with the present system to generate power.

Figure 2:
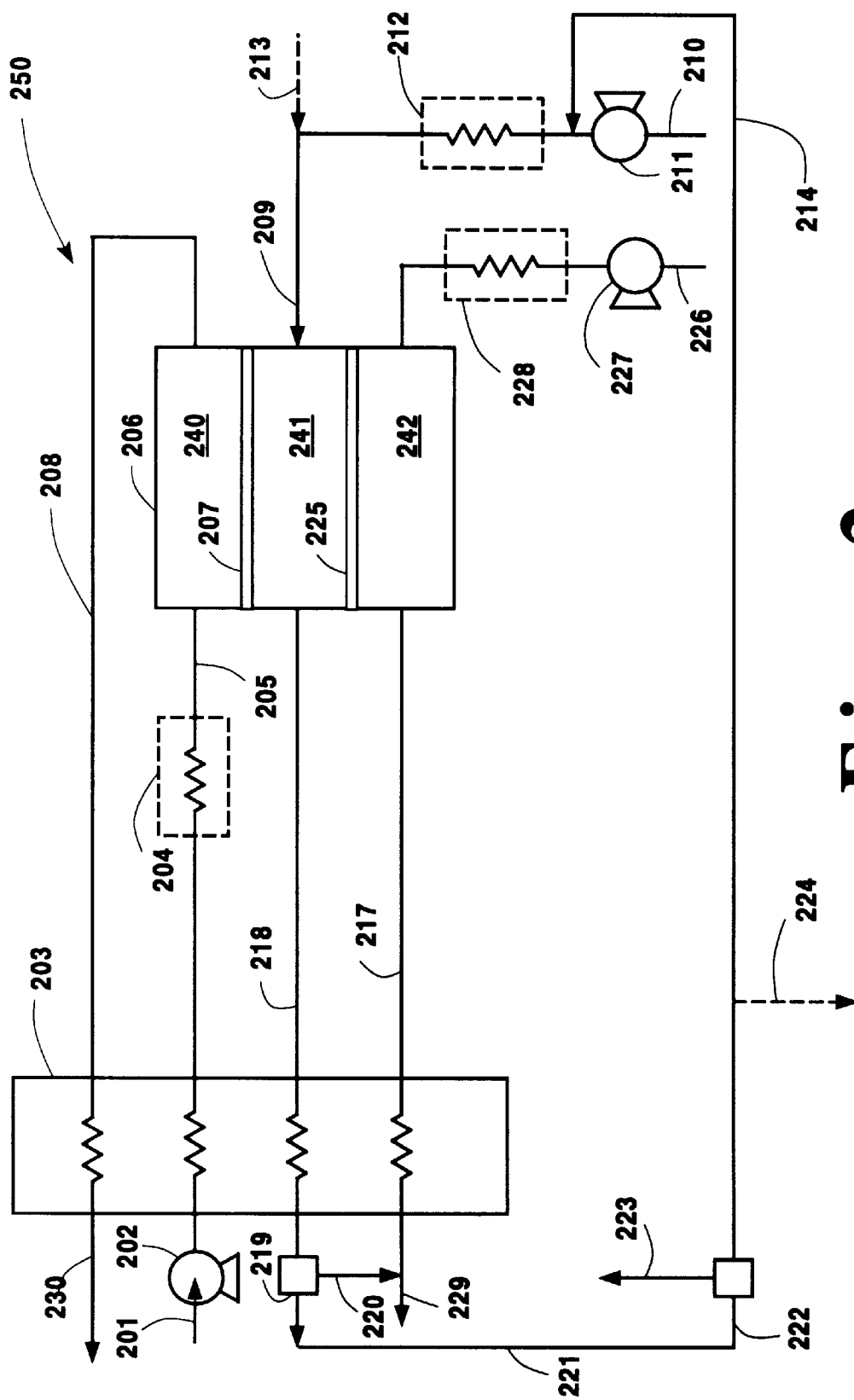
FIG. 2 is a schematic representation of a system for producing hydrogen gas and synthesis gas according to this invention in which oxygen is permeated through an oxygen ion transport membrane producing synthesis gas, and hydrogen from the synthesis gas is permeated through a hydrogen transport membrane producing hydrogen, wherein both membranes are found within one reactor.

Another embodiment of this invention is presented in system 250, FIG. 2. In this embodiment, an oxygen ion transport membrane reactor is combined with a hydrogen separator in a single unit. This system enables oxygen separation, synthesis gas production, and hydrogen separation in the same membrane unit providing improved equilibrium conditions in the reactor.

Oxygen-containing gas stream (preferably air) 201 is compressed to a high pressure using blower 202, and then heated against waste (or nitrogen product) stream 208 in heat exchanger 203, and then to an optional heater 204, emerging as heated compressed oxygen-containing gas stream 205. Gas stream 205 is fed into first zone 240 of oxygen ion transport membrane reactor 206, the reactor having been divided into first zone 240 and second zone 241 by oxygen ion transport membrane 207. As used herein, the first zone is where oxygen-containing gas 205 is fed, or alternatively, is termed as the oxygen cathode or oxygen-retentate side. In reactor 206, a portion of the oxygen-containing gas in first zone 240 is removed and the exiting stream 208 is a nitrogen-enriched stream. Oxygen is transported across membrane 207 into second zone 241, or alternatively termed as the permeate side or anode side, where it is purged using gas mixture 209 containing organic fuel 210.

Under typical operating conditions in the ion transport membrane reactor, the fuel gas undergoes partial oxidation to produce synthesis gas and a variety of other components including carbon dioxide, water and other hydrocarbons. A catalyst may be incorporated in the second zone 241 of reactor 206.

Purge gas 209 is a carbonaceous fuel, preferably methane or natural gas. Purge gas 209 is preferably pressurized in compressor 211, and further optionally heated in heater 212, mixed with steam or atomized water 213, and a recycled exhausted synthesis gas stream 214.

At the temperatures typical of ion transport membrane operation, the oxygen partial pressure in the purge-gas stream is low, typically less than $10^{-10}$ atm, which facilitates rapid oxygen transport across the oxygen ion transport membrane, and permits low compression of the oxygen-containing gas stream. This aspect of the reactor enables oxygen to be transported with a low power requirement.

Reactor 206 also features hydrogen transport membrane 225, and where hydrogen transport through membrane 225 emerging as high purity hydrogen permeate into third zone 242, or alternatively referred to as the hydrogen permeate or anode side. The removal of hydrogen changes the equilibrium conditions in the second zone 21 favorably to increase the yield of hydrogen.

Another purge gas 226 is optionally used to remove the permeated highly pure hydrogen gas from third zone 242. Purge gas 226 may be a gas that is readily separated from $H_2$, such as steam or $N_2$. Preferably, purge gas 226 is pressurized in compressor 227, and further optionally heated in heater 228.

Emerging from reactor 206 through the partial oxidation reaction of fuel 210 in second zone 241 is carbon monoxide rich stream 218, which may be removed and recovered. Stream 218 may be used to provide heat against oxygen-containing gas stream 201 in heat exchanger 203. Further hydrogen recovery may be provided as stream 218 passes through separator 219, emerging as carbon monoxide rich stream 221 and separated hydrogen stream 220. Recovery of carbon monoxide stream 221 takes place in carbon monoxide separation unit 222 as pure or nearly pure carbon monoxide 223. Exhausted waste stream 214 emerges from carbon monoxide separation unit 222, and is optionally discarded as waste stream 224.

Hydrogen rich stream 217 emerging from third zone 242 of reactor 206 passes through heat exchanger 203. Separately, hydrogen rich stream 220 separated from carbon dioxide rich stream 218 in separator 219 may be combined with hydrogen rich stream 217 forming hydrogen rich stream 229.

The system provided by the embodiment of FIG. 2 also encourages greater production of synthesis gas. Because hydrogen is separated in situ, the partial pressure of hydrogen is reduced in the partial oxidation reaction. Consequently, Le Chatelier's principle favors synthesis gas formation even further by shifting the partial oxidation/steam reforming reactions more to the product side. By introducing the organic fuel to the second zone at elevated pressure, hydrogen is generated at sufficiently high pressure to drive it across the hydrogen transport membrane. Alternatively, a purge gas may be used to effect hydrogen separation in the embodiment employing an independent oxygen and a hydrogen separator. For example, steam could be used as a purge gas in the hydrogen separator since the steam can be easily separated from the hydrogen by condensation.

If the conversion in the reactor is incomplete, the purge stream will contain unreacted fuel, wherein at least a portion of the stream may be recycled to the reactor, preferably after hydrogen and carbon monoxide has been removed.

Various other aspects of the FIG. 1 embodiment as described above are also applicable to the FIG. 2 embodiment, and will be appreciated by those skilled in the art. Various functions such as heat exchange in exchangers 3 or 203 may be integrated into reactor 6 or 206 such as disclosed in U.S. patent application Ser. No. 08/848,204, now U.S. Pat. No. 5,820,655, issued Oct. 13, 1998, entitled "SELIC Reactor Design", which is incorporated herein by reference.

It is contemplated that this invention can be further extended using products derived from this invention. For example, the separate hydrogen rich and nitrogen rich streams produced from this invention can be used in the production of ammonia. Additionally, the synthesis gas as produced by this invention is a valuable commercial product which may be used in fuel cells or for the production of chemicals such as methanol, acetic acid, dimethyl ether, acetonitrile and formaldehyde. Accordingly, the synthesis gas production may be integrated with the downstream process, optionally with adjustment of the hydrogen/carbon monoxide ratio.

Specific features of the invention are shown in one or more of the drawings for convenience only, as each feature may be combined with other features in accordance with the invention Alternative embodiments will be recognized by those skilled in the art and are intended to be included within the scope of the claims.

What is claimed is:

1. A process for producing hydrogen gas and synthesis gas comprising the steps of:
   (a) passing a compressed and heated oxygen containing gas mixture into an oxygen reactor comprising at least one solid electrolyte oxygen ion transport membrane, said reactor having a first zone and a second zone separated by said oxygen ion transport membrane, wherein at least a portion of oxygen from said mixture is transported across said oxygen ion transport membrane from said first zone to said second zone to generate a first permeate stream in said second zone to react with a purge stream containing a gas phase organic fuel while producing a oxygen-depleted retentate stream from said first zone;
   (b) passing said purge stream into said second zone to react with said transported oxygen to produce synthesis gas in said first permeate stream;
   (c) directing said first permeate stream to contact at least one hydrogen transport membrane to generate a high purity hydrogen permeate and a hydrogen-depleted synthesis gas retentate; and
   (d) withdrawing said high purity hydrogen permeate as a hydrogen gas stream product.

2. The process of claim 1 further comprising a hydrogen separator having said hydrogen transport membrane, and a conduit for directing said first permeate stream to said hydrogen separator.

3. The process of claim 2 further comprising reducing the temperature of said first permeate stream prior to passing into said hydrogen separator.

4. The process of claim 1 wherein said oxygen containing gas mixture is heated at least in part by heat exchange with at least one member selected from the group cosisting of said oxygen-depleted retentate gas from the first zone, said hydrogen-depleted synthesis gas retentate and said hydrogen permeate gas from said hydrogen separator.

5. The process of claim 1 wherein said gas-phase organic fuel is comprised of organic fuel treated with steam or atomized water.

6. The process of claim 5 wherein said organic fuel is a combustible hydrocarbon.

7. The process of claim 1 further comprising the step of recovering heat from said oxygen-depleted stream.

8. The process of claim 1 further comprising the step of withdrawing said synthesis gas after step (b).

9. A process for producing hydrogen gas comprising the steps of:
   (a) passing a compressed and heated oxygen containing gas mixture into an oxygen reactor comprising at least one solid electrolyte oxygen ion transport membrane, said reactor having a first zone and a second zone separated by said first oxygen ion transport membrane, wherein at least a portion of oxygen from said mixture is transported across said oxygen ion transport membrane from said first zone to said second zone to supply a first oxygen permeate stream to react with a purge stream containing a gas phase organic fuel while producing an oxygen-depleted retentate stream from said first zone;
   (b) passing said purge stream into said second zone to react with said transported oxygen to produce synthesis gas;
   (c) withdrawing and passing from said second zone said first permeate stream of said synthesis gas into a third zone in a hydrogen separator comprising at least one solid electrolyte hydrogen transport membrane, said hydrogen separator having said third zone and a fourth zone separated from each other by said hydrogen transport membrane, wherein at least a portion of said synthesis gas is transported across said hydrogen membrane from said third zone to said fourth zone to generate a hydrogen permeate in said fourth zone and a hydrogen-depleted synthesis gas in said third zone; and
   (d) withdrawing said hydrogen permeate from said fourth zone as a hydrogen gas stream product.

10. The process of claim 9 wherein the temperature of said stream of synthesis gas is optionally reduced prior to passing into said hydrogen separator.

11. The process of claim 9 wherein said mixture is heated at least in part by indirect heat exchange with at least one member selected from the group consisting of said oxygen-depleted retentate from said first zone, said hydrogen-depleted retentate synthesis gas from said third zone and said hydrogen permeate from said fourth zone.

12. The process of claim 9 wherein said gas-phase organic fuel is comprised of organic fuel treated with steam or atomized water.

13. The process of claim 9 wherein said organic fuel is a combustible hydrocarbon.

14. The process of claim 9 further comprising the step of recovering heat from said oxygen-depleted stream.

15. The process of claim 9 further comprising withdrawing said synthesis gas after step (b).

16. A process for producing hydrogen gas comprising the steps of:
   (a) passing a compressed and heated oxygen containing gas mixture into a membrane reactor comprising at least one solid electrolyte oxygen ion transport selective membrane and at least one solid electrolyte hydrogen ion transport membrane, said reactor having a first zone, second zone and a third zone, wherein at least a portion of oxygen from said mixture is transported across said oxygen ion transport membrane from said first zone to said second zone to generate an oxygen-depleted retentate stream from said first zone;
   (b) passing a gas-phase organic fuel into said second zone to react with said transported oxygen to produce synthesis gas;
   (c) directing said synthesis gas to contact at least one hydrogen transport membrane to generate a high purity hydrogen permeate in said third zone, and a hydrogen-depleted synthesis gas retentate in said second zone; and
   (d) withdrawing said hydrogen permeate from said third zone as a hydrogen gas stream product.

17. The process of claim 16 wherein said mixture is heated at least in part by indirect heat exchange with at least one member selected from the group consisting of said oxygen retentate from said first zone, said hydrogen depleted synthesis gas from said second zone, and said hydrogen permeate from said third zone.

18. The process of claim 16 wherein said gas-phase organic fuel is comprised of organic fuel treated with steam or atomized water.

19. The process of claim 16 wherein said organic fuel is a combustible hydrocarbon.

* * * * *